US 6,646,716 B1

(12) United States Patent
Ramanujan et al.

(10) Patent No.: US 6,646,716 B1
(45) Date of Patent: *Nov. 11, 2003

(54) METHOD AND APPARATUS FOR PRINTING MULTIPLE SIMULTANEOUS IMAGES ONTO A PHOTOSENSITIVE MEDIA

(75) Inventors: Sujatha Ramanujan, Pittsford, NY (US); Victor C. Wong, Rochester, NY (US); Badhri Narayan, Rochester, NY (US); Dan S. Talbot, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 09/626,633

(22) Filed: Jul. 27, 2000

(51) Int. Cl.[7] ........................... G03B 27/32; G03B 27/54
(52) U.S. Cl. ........................................ 355/67; 355/32
(58) Field of Search .................... 355/38, 45, 67, 355/71, 32, 77, 46, 54; 353/31, 63, 64, 98; 358/302, 471; 347/239, 255, 256; 359/72, 246, 247, 263, 267, 292, 630, 629; 349/5, 9

(56) References Cited

U.S. PATENT DOCUMENTS

| | | | |
|---|---|---|---|
| 4,728,965 A | 3/1988 | Kessler et al. | 347/241 |
| 5,061,049 A | 10/1991 | Hornbeck | 359/224 |
| 5,325,137 A | 6/1994 | Konno et al. | 353/63 |
| 5,327,263 A * | 7/1994 | Katagiri et al. | 348/761 |
| 5,461,410 A | 10/1995 | Venkateswar et al. | 347/240 |
| 5,461,411 A | 10/1995 | Florence et al. | 347/240 |
| 5,504,514 A | 4/1996 | Nelson | 347/130 |
| 5,517,340 A * | 5/1996 | Doany et al. | 348/742 |
| 5,521,748 A | 5/1996 | Sarraf | 359/321 |
| 5,652,661 A | 7/1997 | Gallipeau et al. | 358/302 |
| 5,701,185 A | 12/1997 | Riess et al. | 358/471 |
| 5,721,622 A | 2/1998 | Venkateswar | 358/298 |
| 5,743,610 A | 4/1998 | Yajima et al. | 353/31 |
| 5,743,612 A | 4/1998 | Matsuda et al. | 353/97 |
| 5,745,156 A | 4/1998 | Federico et al. | 347/256 |
| 5,754,305 A | 5/1998 | DeClerck et al. | 358/302 |
| 5,798,819 A * | 8/1998 | Hattori et al. | 349/9 |
| 5,805,274 A | 9/1998 | Saita | 355/38 |
| 5,808,800 A * | 9/1998 | Handschy et al. | 349/11 |
| 6,215,547 B1 * | 4/2001 | Ramanujan et al. | 355/32 |
| 6,330,018 B1 * | 12/2001 | Ramanujan et al. | 347/239 |

* cited by examiner

*Primary Examiner*—Rodney Fuller
(74) *Attorney, Agent, or Firm*—Nelson Adrian Blish

(57) ABSTRACT

A method and apparatus for printing multiple simultaneous images onto a photosensitive media comprises the steps of imaging light from a light source through an optics assembly (75) to a polarization beamsplitter (80). The polarization beamsplitter (80) produces light having a first polarized state and light having a second polarized state. The first polarized light is directed to a first spatial light modulator (90). The first spatial light modulator is addressed with a first signal to create a first modulated light beam, which is imaged through a print lens assembly onto the photosensitive media. A second polarized light is directed to a second spatial light modulator (95). The second spatial light modulator is addressed with a second signal to create a second modulated light beam, which is imaged through the print lens onto the photosensitive media. The first modulated light beam and the second modulated light beam create at least two simultaneous images on the photosensitive media.

12 Claims, 11 Drawing Sheets

METHOD AND APPARATUS FOR PRINTING MULTIPLE SIMULTANEOUS IMAGES ONTO A PHOTOSENSITIVE MEDIA

CROSS REFERENCE TO RELATED APPLICATIONS

Reference is made to commonly assigned copending U.S. patent application Ser. No. 09/197,328, filed Nov. 19, 1998, entitled REFLECTIVE LIQIUD CRYSTAL MODULATOR BASED PRINTING SYSTEM, by Ramanujan et al., the disclosure of which is incorporated herein.

FIELD OF THE INVENTION

This invention relates generally to an apparatus and method for spatially modulating a light beam and imaging the modulated light onto a photosensitive media and in particular, to a method and apparatus for printing multiple simultaneous images onto a photosensitive media.

BACKGROUND OF THE INVENTION

Photographic images are traditionally printed onto photographic paper using conventional film based optical printers. The photographic industry is converting to digital imaging. One step in the digital imaging process uses images obtained from digital cameras or scanned film exposed in traditional photographic cameras to create digital image files that are then printed onto photographic paper.

The growth of the digital printing industry has led to multiple approaches to digital printing. One of the early methods used for digital printing was cathode ray tube (CRT) based printers such as the Centronics CRT recorder. This technology has several limitations related to the phosphor and the electron beam. The resolution of this technology is inadequate when printing a large format images, such as 8 inch by 10 inch photographic print. CRT printers also tend to be expensive, which is a severe shortcoming in a cost sensitive market. An additional limitation is that CRT printers do not provide sufficient red exposure to the media when operating at frame rates above 10,000 prints per hour.

Another commonly used approach to digital printing is the laser based engine as shown in U.S. Pat. No. 4,728,965. Such systems are generally polygon flying spot systems, which use red, green, and blue lasers. Unfortunately, as with CRT printers, the laser based systems tend to be expensive, since the cost of blue and green lasers remains quite high. Additionally, the currently available lasers are not compact. Another problem with laser based printing systems is that the photographic paper used for traditional photography is not suitable for a color laser printer due to reciprocity failure. High intensity reciprocity failure is a phenomenon by which photographic paper is less sensitive when exposed to high light intensity for a short period. For example, flying spot laser printers expose each of the pixels for a fraction of a microsecond, whereas optical printing systems expose the paper for the duration of the whole frame time, which can be on the order of seconds. Thus, a special paper is required for laser printers.

A more contemporary approach uses a single spatial light modulator such as a Texas Instruments digital micromirror device (DMD) as shown in U.S. Pat. No. 5,061,049. Spatial light modulators provide significant advantages in cost as well as allowing longer exposure times, and have been proposed for a variety of different printing systems from line printing systems such as the printer depicted in U.S. Pat. No. 5,521,748, to area printing systems such as the system described in U.S. Pat. No. 5,652,661. One approach to printing using the Texas Instruments DMD shown in U.S. Pat. No. 5,461,411 offers advantages such as longer exposure times using light emitting diodes (LED) as a source. See U.S. Pat. No. 5,504,514. However, this technology is very specific and not widely available. As a result, DMDs are expensive and not easily scaleable to higher resolution. Also, the currently available resolution is not sufficient for all printing needs.

Another low cost solution uses LCD modulators. Several photographic printers using commonly available LCD technology are described in U.S. Pat. Nos. 5,652,661; 5,701,185; and 5,745,156. Most ofthese involve the use of a transmissive LCD modulator, for example U.S. Pat. Nos. 5,652,661 and 5,701,185. While such a method offer several advantages in ease of optical design for printing, there are several drawbacks to the use of conventional transmissive LCD technology. Transmissive LCD modulators generally have reduced aperture ratios and the use of Transmissive Field-Effect-Transistors (TFT) on glass technology does not promote the pixel to pixel uniformity desired in many printing applications. Furthermore, in order to provide large numbers of pixels, many high resolution transmissive LCDs possess footprints of several inches. Such a large footprint can be unwieldy when combined with a print lens. As a result, most LCD printers using transmissive technology are constrained to either low resolution or small print sizes. Also, to print high resolution 8 inch by 10 inch images with at least 300 pixels per inch requires 2400 by 3000 pixels. Transmissive LCD modulators with such resolutions are not readily available. Furthermore, each pixel must have a gray scale depth to render a continuous tone print and do so uniformly over the frame size, which is not available in this technology.

An alternate approach is to utilize reflective LCD modulators which are widely used in the display market. Most of the activity in reflective LCD modulators has been related to projection display. The projectors are optimized to provide maximum luminous flux to the screen with secondary emphasis placed on contrast and resolution. To achieve the goals of projection display, most optical designs use high intensity lamp light sources. Additionally, many projector designs use three reflective LCD modulators, one for each of the primary colors, such as the design shown in U.S. Pat. No. 5,743,610. Using three reflective LCD modulators is both expensive and cumbersome. For projectors using a single reflective LCD modulator, color sequential operation is required. To maintain the high luminosity in combination with the color sequential requirements, a rotating color filter wheel is sometimes employed. This is yet another large, moving part, which further complicates the system.

The recent advent of high resolution reflective LCDs with high contrast, greater than 100:1, presents possibilities for printing that were previously unavailable. See U.S. Pat. Nos. 5,325,137 and 5,805,274. Specifically, a printer may be based on a reflective LCD modulator illuminated sequentially by red, green and blue, light emitting diodes. The reflective LCD modulator may be sub-apertured and dithered in two or three directions to increase resolution.

Dithering has been applied to transmissive LCD systems due to the already less than perfect fill factor. Incorporating dithering into a reflective LCD printing system would allow high resolution printing while maintaining a small footprint. Also, because of the naturally high fill factor present in many reflective LCD technologies, the dithering can be omitted with no detriment to the continuity of the printed image. The use of a reflective LCD serves to significantly reduce the cost of the printing system. Furthermore, the use of an area reflective LCD modulator sets the exposure times at sufficient length to avoid or significantly reduce reciprocity failure. The progress in the reflective LCD device field made in response to needs of the projection display industry have provided opportunities in printing applications. Thus, a reflective LCD modulator designed for projection display can be incorporated into the printing design with little modification to the LCD itself. Also, by designing an exposure system and data path with an existing projection display device allows incorporation of an inexpensive commodity item into a print engine.

Of the reflective LCD technologies, the most suitable to this design is one, which incorporates a small footprint with an integrated Complementary Metal Oxide Semiconductor (CMOS) backplane. The compact size along with the uniformity of drive offered by such a device will translate into better image quality than other LCD technologies. There has been progress in the projection display industry towards incorporating a single reflective LCD, primarily because of the lower cost and weight of single device systems. See U.S. Pat. No. 5,743,612. Of the LCD technologies, the reflective LCD with the silicon backplane can best achieve the high speeds required for color sequential operation. While this increased speed may not be as essential to printing as it is for projection display, the higher speeds can be utilized to incorporate additional gray scale and uniformity correction to printing systems.

While the reflective LCD modulator has enabled low cost digital printing on photosensitive media, the demands of high-resolution printing have not been fully addressed. For many applications, such as imaging for medical applications, resolution is critical. Often, the resolution provided by a single reflection LCD modulator is insufficient. It then becomes necessary to create an image wherein multiple images are merged to create a single high-resolution image. Creating a merged image without artifacts along the borders, or in regions where image data may overlap, is desirable. While juxtaposing or spatially interweaving image data alone may have been attempted in previous applications, such a superposition of images with reflective LCDs provides images of high quality without compromising the cost or productivity of the print engine. By utilizing polarization based modulation, a print engine can utilize light already available in the optical system.

While similar methods have been employed in projection systems, the use of a reflective LCD and dual polarization has not been used in the field of printing. In particular, because of the time delay involved in printing, artifacts present in the stitched image, as well as differences between multiple modulators can be corrected through, for example, software adjustments. This approach is difficult for applications such as projection display, particularly motion imaging. Additionally, in a printing system, all three colors used to create a composite image need not be simultaneously displayed as in a projection system.

An additional issue faced by printing applications is the need to simultaneously print multiple images in close proximity within a reasonable amount of time. While the images need not be real time viewable, faster writing speeds are beneficial in many applications.

Gray scale is also an important factor in printing applications. Modulator printing systems can incorporate a variety of methods to achieve gray scale. Texas Instruments employs a time delayed integration system that works well with line arrays as shown in U.S. Pat. Nos. 5,721,622, and 5,461,410. While this method can provide adequate gray levels at a reasonable speed, line printing Time Delayed Integration (TDI) methods can result in registration problems and soft images. Alternate methods have been proposed particularly around transmissive LCDs such as the design presented in U.S. Pat. No. 5,754,305.

It is desirable to increase the resolution of a photographic image, reduce reciprocity failure, and achieve adequate gray scale. It is also desirable to increase the speed of printing by printing multiple images simultaneously.

SUMMARY OF THE INVENTION

An object of this invention to provide for a high pixel density image at a media exposure plane in a light sensitive media based printing system; and to provide means by which to utilize a high site density spatial light modulator to create multiple digital images simultaneously for imaging onto photographic media.

Briefly, according to one aspect of the present invention, a method of printing multiple simultaneous images onto a photosensitive media comprises the steps of imaging light from a light source through an optics assembly to a polarization beamsplitter. The polarization beamsplitter produces light having a first polarized state and light having a second polarized state. The first polarized light is directed to a first spatial light modulator. The first spatial light modulator is addressed with a first signal to create a first modulated light beam, which is imaged through a print lens assembly onto the photosensitive media. A second polarized light is directed to a second spatial light modulator. The second spatial light modulator is addressed with a second signal to create a second modulated light beam, which is imaged through the print lens assembly onto the photosensitive media. The first modulated light beam and the second modulated light beam create at least two simultaneous images on the photosensitive media.

In one embodiment of the present invention, light sources are imaged through a polarizer, spatial uniformizing optics and a polarizing beamsplitter to create essentially telecentric illumination at the plane of a spatial light modulator. The spatial light modulator is comprised of a plurality of modulator sites in two dimensions. Individual modulator sites rotate the polarization state of incoming light according to a data signal, and reflected light passes again through the polarizing beamsplitter cube. Light is then imaged through a print lens assembly and an additional polarization element onto a media plane. The media is exposed with at least two images. The media is then moved to a second position and a new image are printed.

In another embodiment, the printer incorporates at least two reflective liquid crystal display devices, illuminated by multiple wavelengths, which expose photosensitive media. In the first configuration, two LCDs are placed at opposing facets of a beam splitting cube. White, composite LEDs or a white light source, light illumination is divided into TE and TM polarization states by the polarizing beamsplitter cube. At each facet of the beamsplitting cube there a single spatial light modulator which modulates the incoming light. The light from both facets passes through a single print lens and is imaged onto photosensitive media. Because the LCDs are displaced with respect to the center of the beamsplitting cube, two distinct images are created at the image plane.

In yet another embodiment, multiple LCDs are used at each facet to create more than two distinct images.

In another embodiment, color sequential illumination results in at least two distinct color images.

In a further embodiment LCDs with different aspect ratios, landscape and portrait, print multiple formats simultaneously.

In yet another embodiment, multiple images are printed monochromatically

The invention and its objects and advantages will become more apparent in the detailed description of the preferred embodiment presented below.

DETAILED DESCRIPTION OF THE INVENTION

Figure 1:
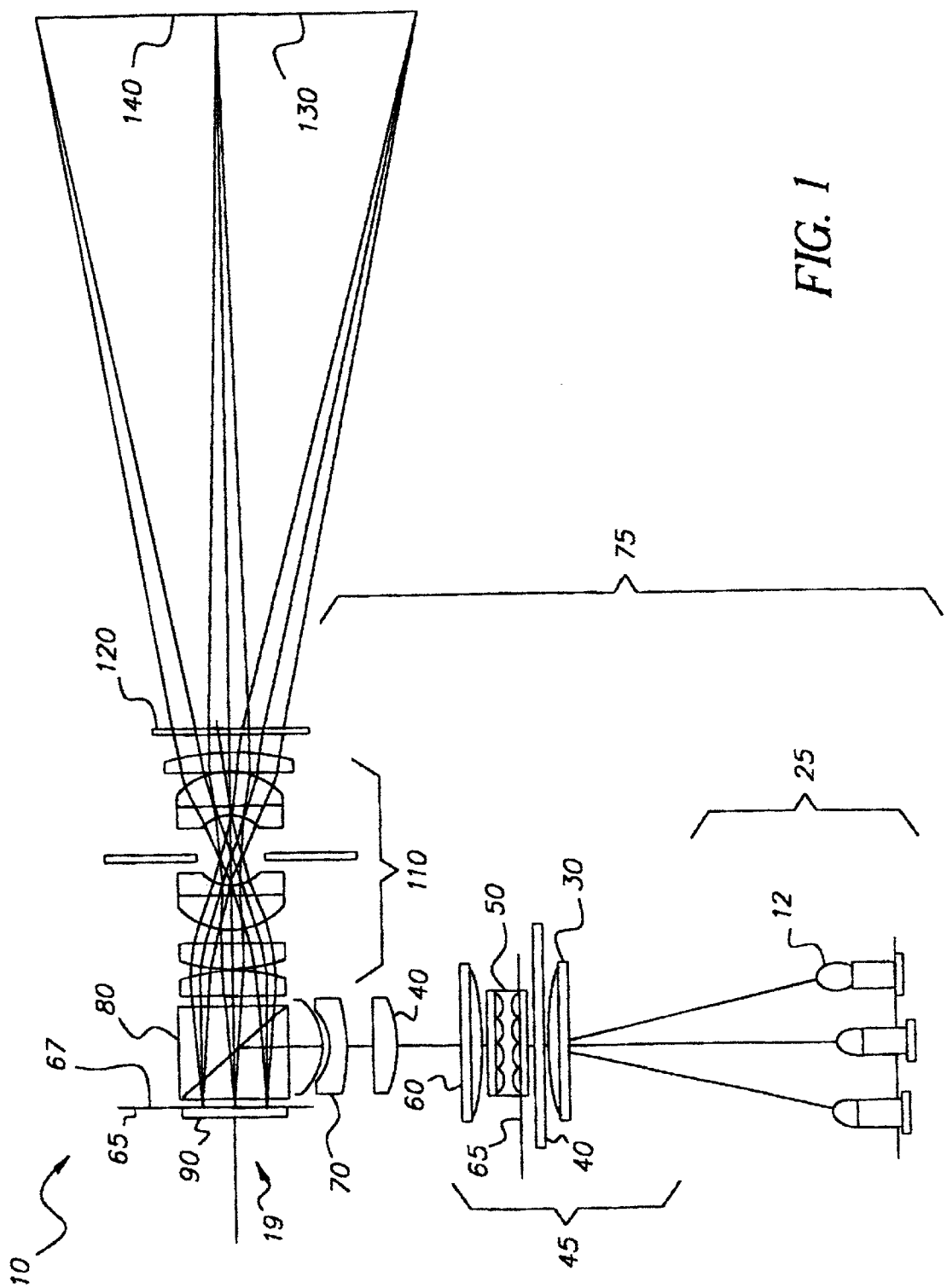
FIG. 1 is a schematic view of a reflective LCD modulator system for printing two-dimensional swaths.

Referring to FIG. 1, there is illustrated a printer referred to in general by numeral 10. The photographic printer is comprised of a light emitting diode (LED) array 25, uniformizing optics 45, polarizing beamsplitter 80, reflective LCD modulator 90, a data path 19 for providing image information to the reflective LCD modulator 90, and a print lens assembly 110. The photographic printing system 10 provides a two-dimensional image on light sensitive media 140 located at an image plane 130.

The LED array 25, is arranged in a two-dimensional array. Each of the LEDs emits one of three distinct wavelengths, red, blue, or green. The LEDs 12 are typically mounted in a circular aperture and are arranged such that the colors of emission are spread evenly about the aperture. The relative number of LEDs emitting at a given wavelength is determined by the sensitivity of the media onto which the light is imaged. For example, the array may consist of four red LEDs, two green LEDs, and two blue LEDs. The LEDs are spaced such that a significant fraction of the light emitted can be captured in the collection aperture of the illumination optics 75. Furthermore, redundancy in emitters reduces the system sensitivity to malfunction in any individual LED.

The LEDs 12 are operated in a pulsed and color sequential manner. For any given image, groups of LEDs are activated in order of wavelength. For example, the red LEDs are activated and deactivated, the blue LEDs are activated and deactivated, then the green LEDs are activated and deactivated. Any activation cycle for a given wavelength consists of a series of pulses, which may vary in duration or amplitude. The length and duration of the pulses is determined by the level of illumination needed per image to define the gray scale and by the sensitivity of the light sensitive media 140 to light level and illumination time.

Certain photosensitive media, which includes but is not limited to photographic paper, photographic film, microfilm, and both wet and dry light sensitive media, require only monochromatic illumination. For such applications, LEDs of a single wavelength are employed and there is no color sequence. It should also be noted that LEDs are suitable for the lower cost applications, but for applications where speed is or throughput is more critical, lasers can be substituted for some or all of the LEDs. Each of the LEDs 12 is mapped by the illumination optics 75 to cover the area of the reflective LCD modulator 90 in a uniform and essentially telecentric manner at the conjugate plane 65 at the modulator plane 67. This design is unique to printing applications because the requirements for uniformity of illumination and uniformity of image are far more stringent in printing then in projection display. Specifically, the tolerance to roll-off at the edges of the illumination is much greater in a projection system. The telecentricity is required to maintain the uniformity of the image at the image plane 130 due to constraints on the LCD operation. The conjugate planes 65 are shown in FIG. 1 and referred to throughout the remainder of the specification.

The illumination optics 75 is designed to illuminate a nearly square or rectangular aperture. In general, axially symmetric components are employed in the illumination. Following the LEDs 12 are uniformizing optics 45 comprising a field lens 30 that images light to a lenslet array 50 and field lens 60. The light at the intermediate conjugate plane 65 is broken into a number of portions equivalent to the number of elements in the first portion of lenslet array 50. The individual portions are then superimposed and magnified by the second portion of lenslet array 50 and the field lens 60. A condenser lens 70 is positioned immediately before the polarizing beamsplitter 80.

In a single reflective LCD modulator imaging system a linear polarizer 40 may be incorporated in the illumination optics 75 prior to the polarizing beamsplitter 80. However, for a system designed to illuminate multiple devices, the optical system can be modified to incorporate two distinct polarization states by simply utilizing multiple states of polarization produced by the source. Light from the LEDs 12 is randomly polarized. Consequently light of one polarization state passes through the polarizing beamsplitter 80 while light from a second state of polarization is directed at a right angle. The distance from the lenslet array 50 to the plane each of the modulator planes is equidistant for each of the paths.

Figure 2A:
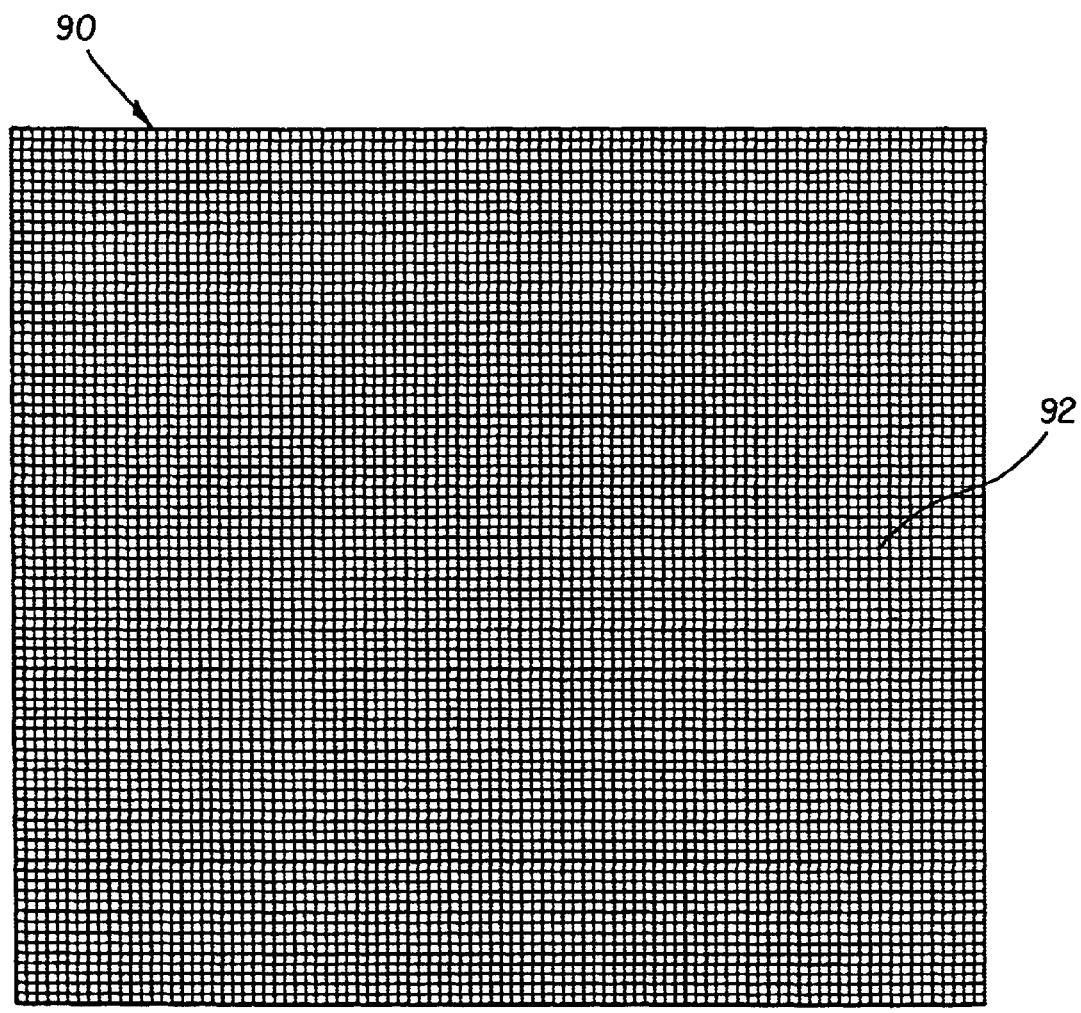
FIGS. 2a and 2b are top plan view and a side view in cross section, respectively, of a reflective LCD modulator.
Figure 2B:
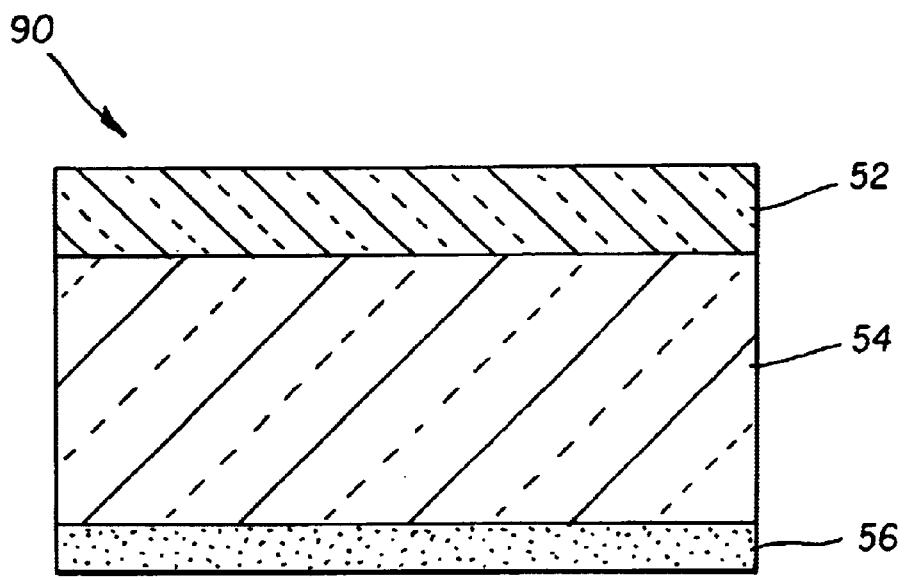

FIGS. 2a and 2b show a top view a reflective LCD modulator 90 as used in the present invention. The reflective LCD modulator 90 consists of a plurality of modulator sites 92 that are individually modulatable. Light passes through the top surface of LCD 52 and liquid crystal material 54, and is reflected off the back plane 56 of the modulator, and returns through the modulator. If a modulator site 92 is "on" or bright, during the round-trip through the reflective LDC modulator 90, the polarization state of the light is rotated. In an ideal case the polarization state of the light is rotated 90 degrees, although this degree of rotation is difficult to achieve. If a given modulator site is "off" or dark, the polarization state of the light is not rotated. The light that is not modulated, i.e., not rotated, is not passed straight through the polarizing beamsplitter 80 but is redirected away from the light sensitive media 140 plane by the polarized beamsplitter 80. It should be noted that the polarization state of the light that is rotated by a reflective LCD modulator 90 may become elliptically polarized, however, upon passing through a linear polarizer 120, shown in FIG. 1, the light will regain linearity.

Referring again to FIG. 1 the reflective LCD modulator 90 and the polarized beamsplitter 80 are followed by print lens assembly 110 and a linear polarizer 120. This lens assembly provides the correct magnification or demagnification of the image of the reflective LCD modulator 90 to the image plane 150 where the media light sensitive media 140 is located. The print lens assembly 110 is designed to provide magnification relating to a given image size at the media plane. Once imaged at the media plane, the printer moves the media to a next position and the next image is recorded. In any system on any media on which images are created at multiple wavelengths, a composite tri-color image will be referred to as an image.

The most readily available choice of reflective polarization based modulators is the reflective liquid crystal modulator. Such modulators, originally developed for use in projection display, can have resolutions as high as 4000× 2000 modulator sites. Currently, resolutions of 1200×1600 are available with footprints as small as 0.9 inches diagonal. These high-resolution reflective LCD modulators, are often twisted nematic LCDs, or homeotropically aligned reflective LCD modulators, although other types of reflective LCD modulators such as ferroelectric are often employed in projection display. Some of the key characteristics of these LCDs are high resolution; high contrast (>100:1) in all three primary colors; fast frame rate, 70 frames per second or higher; and high aperture ratio, i.e. greater than 90%. In addition, the incorporation of a CMOS backplane increases the uniformity across the array. The LCDs are also capable of producing an eight bit gray scale either through pulse width modulation or through analog operation. In either case data may be introduced digitally to the printing system. These characteristics ensure that the reflective LCD modulator is an excellent choice for use in a reflective printing system.

The reflective LCD modulator 90 can be designed in a number of different configurations. The most amenable to a low cost printing system is a single chip system used in color sequential mode. Such a LCD may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors.

The optical system described is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the dark or "off state." In this state, the polarization state of the light is not rotated and should not be directed thought the polarizing beamsplitter 80 and imaged. If the polarization state of the light is in fact rotated, light will leak through the imaging system and decrease the contrast. Additionally some applications require throughputs greater than what is achievable in a color sequential system. For such applications, multi-chip printing is a good choice.

Figure 3:
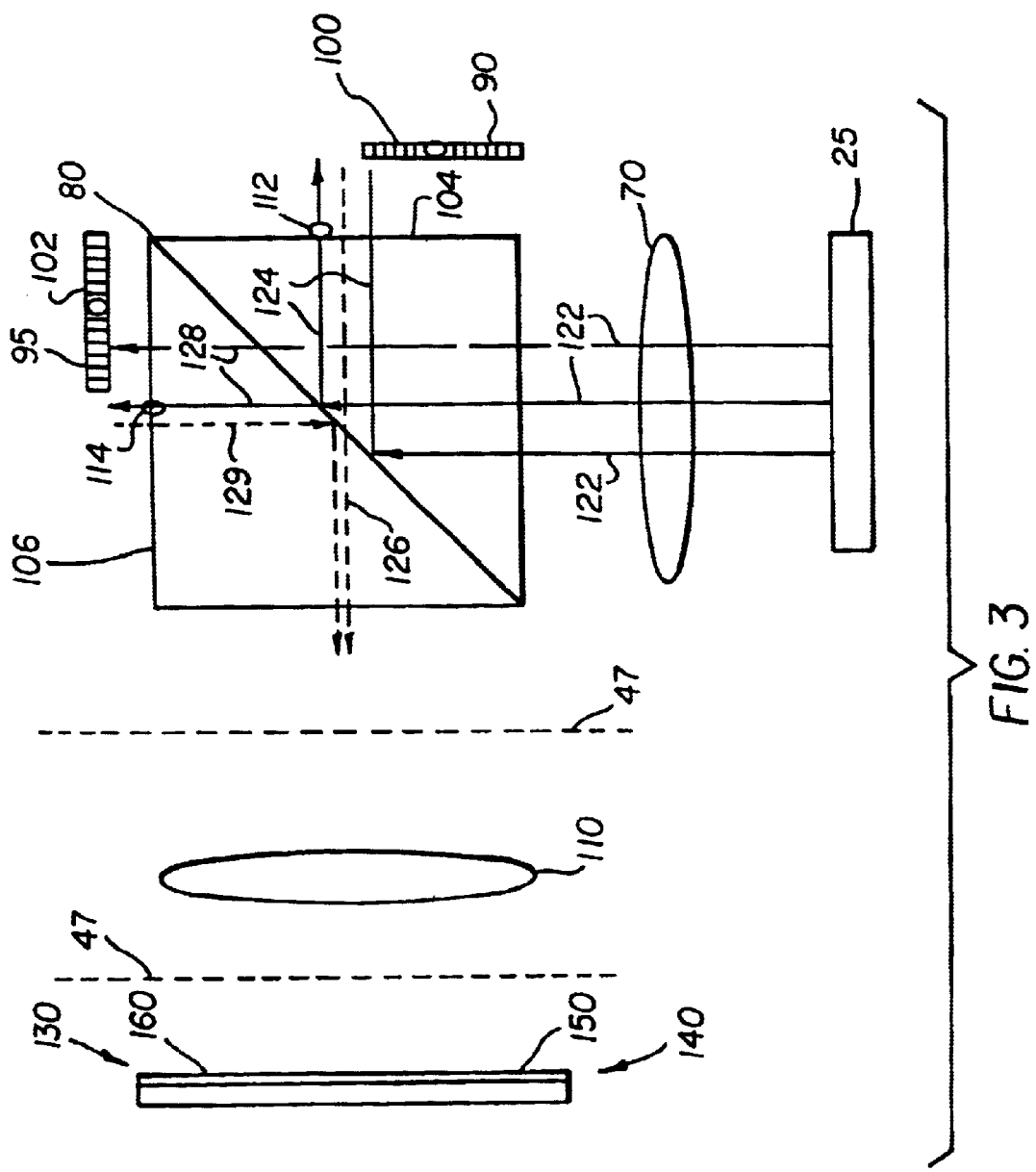
FIG. 3 is a schematic view of a reflective LCD modulator printing system utilizing a polarizing beamsplitter and two reflective LCD modulators.

The present invention, shown in FIG. 3, is for a two dimensional reflective polarization based reflective LCD modulator with multiple reflective LCD modulators. Incident light 122 is comprised of s-polarization state 124, which is redirected by the polarizing beamsplitter 80 to the reflective LCD modulator 90. The p-polarization state 128 passes through the polarizing beamsplitter 80 and to reflective LCD modulator 95. In this manner, the optical system utilizes multiple reflective LCD modulators 90, 95 without reducing the light intensity at the modulator and therefore without inhibiting system productivity. Light impinging on each reflective LCD is modulated and reflected back 126, 129 through the polarizing beamsplitter 80. Modulated light from the reflective LCDs is passed through the polarizing beamsplitter 80 to the print lens assembly 110 assembly and subsequently imaged at the image plane 130 onto the light sensitive media 140.

Figure 4:
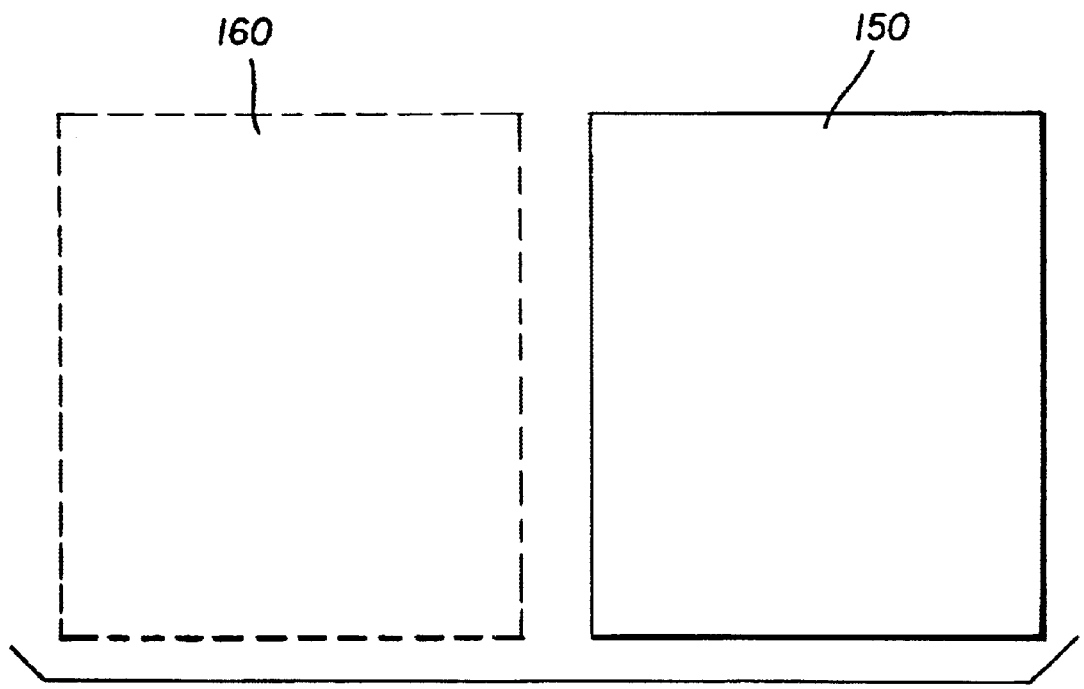
FIG. 4 shows multiple images at the image plane.

In the embodiment depicted in FIG. 3, the center 100, 102 of each LCD 90, 95 is significantly displaced from the center of the beamsplitting 112, 114 cube on respective facets 104, 106. This system uses a color sequential mode, where each device prints red green and blue data sequentially. (LEDS, lasers can be used, or white light with filters). Because the LCDs are displaced from the center of each facet, multiple images are printed (multi-up). This results in a system in which the effective throughout is twice that of a single chip color sequential system. The resulting image at the media plane is shown in FIG. 4. The resulting image on the light sensitive media 140 is comprised of two distinct images 150, 160.

The light directed onto the reflective LCD modulators 90, 95 is essentially telecentric. This aspect of the invention sets it apart from systems generally used for projection display. If the light impinging is not telecentric, then modulation across the different angles of incident light will bot be uniform, which will lead to a severe degradation in contrast in a polychromatic system.

Light impinging on reflective LCD modulator 90 is of the s-polarization state 124. Light that is modulated at reflective LCD modulator 90 is reflected p-polarized 126, and passes through the polarizing beamsplitter 80 to the image plane. Light impinging on reflective LCD modulator 95 is p-polarized state 128. Modulated light from reflective LCD modulator 95 is reflected s-polarized 129 and passes through the polarizing beamsplitter 80 and is imaged at the image plane 130. Because light directed to the image plane is of opposite polarization states in a multi LCD system, polarization sensitive elements between the polarizing beamsplitter 80 and the image plane should be avoided.

Because the LCDs are displaced from one another and fed distinct image data, the images are displaced from one another. The result is two distinct images at the media plane. Additionally, because each of the reflective LCD modulators in FIG. 3 is operating on light of opposite initial polarization states, the activation voltage may differ between the two modulators. Ideally, s-polarization is converted to p-polarization at the first modulator, and p-polarization is converted to s-polarization at the second modulator. However, because polarization rotation is not perfect at the modulator, care must be taken in the addressing scheme to allow adequate modulation at each device.

Figure 5:
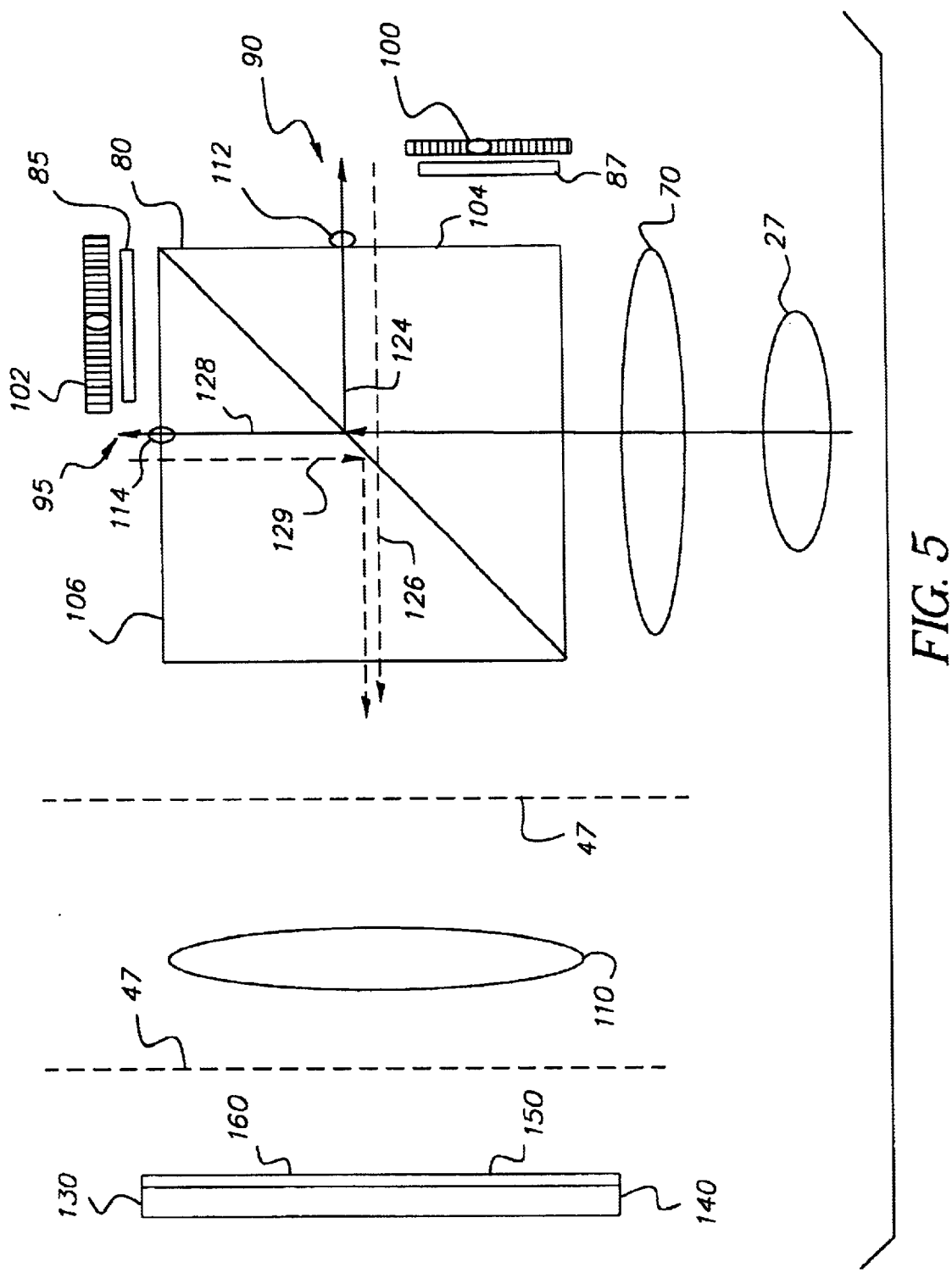
FIG. 5 is a schematic view of a reflective LCD modulator printing system utilizing a polarizing beamsplitter, two reflective LCD modulators, color filters, and a white light illuminator.

The polarization beamsplitter referred to in all polychromatic printing requires a broadband coating sufficient to allow the multiple wavelengths of illumination. Without the coating, scattering would severely degrade the contrast. If the light source employed in the color sequential printing is broadband, like a halogen lamp 27, color filters 85, 87 need to be placed between the LCD and the cube. Furthermore, the filters will need to be switchable so that blue and green light is filtered out when red data is displayed, and similarly for the other two colors. Color sequential nature is obtained by changing the data at the LCDs and switching the color filters, which may be mounted on a wheel. This system is shown in FIG. 5.

Figure 6B:
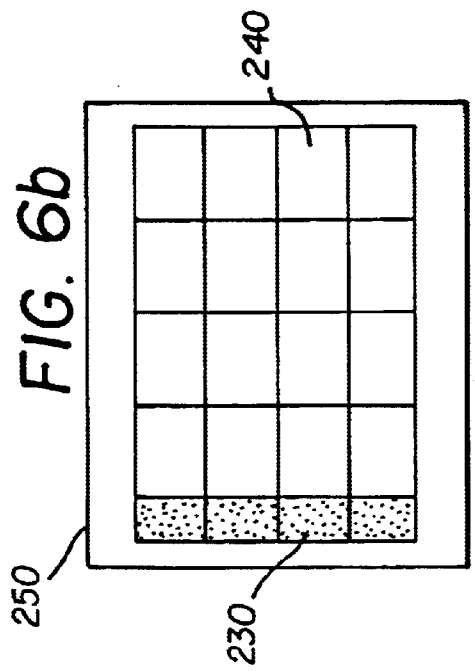
FIG. 6 depicts a four-step dither at the image plane.
Figure 6D:
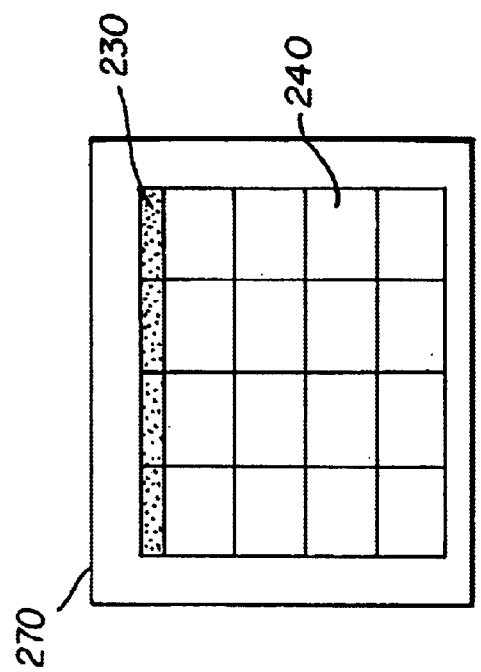
Figure 6A:
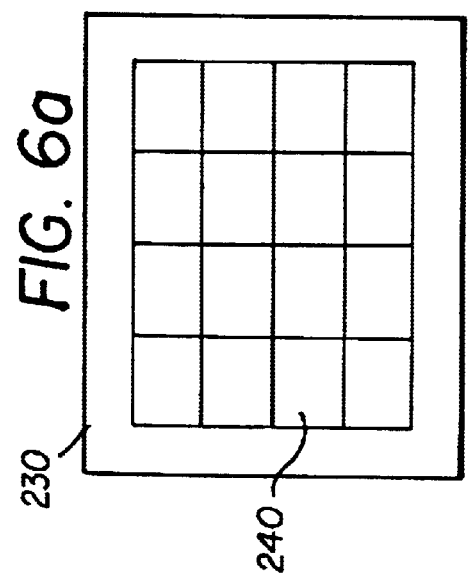
Figure 6C:
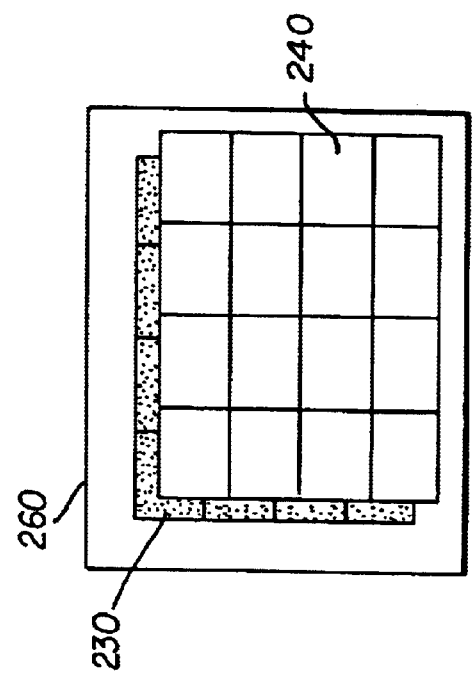

To increase resolution of the printing system, the combination of LCDs may be used to increase resolution. One of the issues when printing with a two-dimensional modulator is the effect of modulator site defects. Another possible issue is a need to increase resolution for larger print sizes. Both these issues can be addressed through dithered printing. To dither a full aperture LCD is to image the reflective LCD modulator 90 at one position, the reflective LCD modulator 90 is repositioned a fraction of a modulator site distance away and imaged again. Thus, multiple images are created and overlapped. By overlapping multiple images, the system acquires a redundancy that corrects for modulator site failure or drop out. Furthermore, by interpolating and updating the data between positions, the effective resolution is increased. One particular dithering scheme is depicted in FIGS. 6a–6d. First, reflective LCD modulator 90 is positioned at a given position 230 and modulator sites 240 are imaged (FIG. 6a). Modulator 90 is then moved to a second position 250 (FIG. 6b) one half of a modulator site laterally displaced from previous position 230. Reflective LCD modulator 90 is then imaged at position 250. Reflective LCD modulator 90 is then displaced one half of a modulator site longitudinally from previous position, to new position 260 (FIG. 6c), which is diagonally displaced from initial position 230. Modulator sites 240 are illuminated and the media exposed again. Reflective LCD modulator 90 is then moved to a fourth position 270 (FIG. 6d) which laterally displaced from third position 260. The media is then exposed at this position. Effectively, there is a four fold increase in the amount of data written. This serves to increase image resolution and provide means to further sharpen images. With a high aperture ratio, it may be sufficient to simply dither in one diagonal direction to achieve comparable results.

When printing with a LCD, the device itself ensures some level of subaperturing on a pixel by pixel basis. For this reason, the actual data content in an image can be doubled when the gap regions are over-written.

Dithering requires motion of each modulator in two directions. Each motion is approximately between 5 um and 20 um for a typical reflective LCD modulator. In order to achieve this motion, many different actuator or motion assemblies can be employed. For example, the assembly can use two piezo-electric actuators. In a multi-chip system it reduces complexity if the LCDs are dithered simultaneously and for the same distance. However, because the system is printing distinct images, one device may not be dithered, or the devices may not be simultaneously dithered. Additionally, for different LCDs the distances may differ.

One aspect of this invention that separates the design and implementation from projection display is the contrast required for printing. In particular, photosensitive media may require contrast as low as 30:1 for a particular color. Also, in general, the contrast requirement for red light is more severe than that required for blue light because the media on which data is projected is generally more sensitive to blue light. In projection display systems contrast of greater than 100:1 is often required. Furthermore, contrast requirements are equally stringent in all three colors for projection displays. The design implications of these differences is significant. With two LCDs the total amount of leakage light passing through the cube in the imaging system would double from that of a single LCD system. Leakage in both polarization stares would degrade the contrast. In single LCD systems, a linear polarizer can be placed after the cube to clean up leakage. Such a solution would be unacceptable in a two LCD system. Use of two separate modulators operating in opposite polarization states, inhibits the use of polarization compensation elements following the polarizing beamsplitter. For example, a polarizer placed to clean up leakage p-polarization light from reflective LCD modulator 95 would increase the contrast of reflective LCD modulator 95. It would concurrently reduce the peak light level and contrast from reflective LCD modulator 90. In a printing application, the loss in contrast may not be catastrophic. For example, contrast may drop from 140:1 to 60:1. The latter contrast is well within the range of may different photographic media; however, it is too low for the average projection system.

Another major difference between the present invention and projection displays stems from the independent color requirements. Because the required contrast for red light printing is often greater than that required for the other colors, a color sequential system is an achievable goal. Specifically, a device and optical system designed primarily around red light is adequate in the blue and green spectrum. So, a single chip color sequential system does not require a special LCD and can be implemented with a device designed for color separated projection. It may be necessary, however, to change the backplane voltage of the LCD as a function of illumination wavelength.

Figure 7:
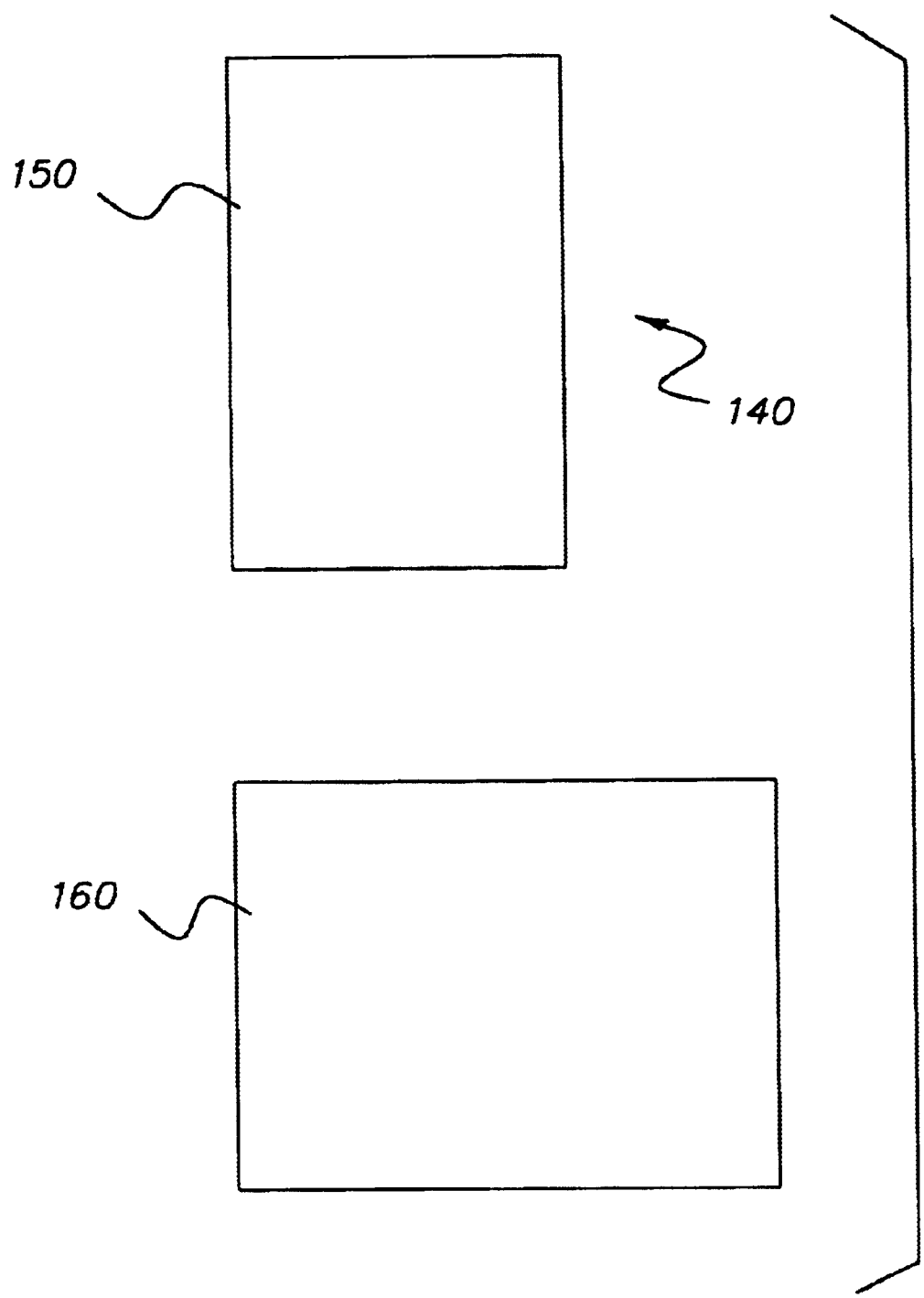
FIG. 7 is a view of the image plane showing landscape and portrait images when different aspect ratio employed or when different size LCDs are used.

When printing with multiple LCDs the ability to print images of different aspect ratios by using different sized or placed LCDs becomes possible. By placing one LCD at one facet in landscape mode and another LCD at the other facet in portrait mode, images can be printed next to each other with different aspect ratios. The image at the media 140 of such a case is shown in FIG. 7, where one image is landscape 150, and the second is portrait 160.

Figure 8:
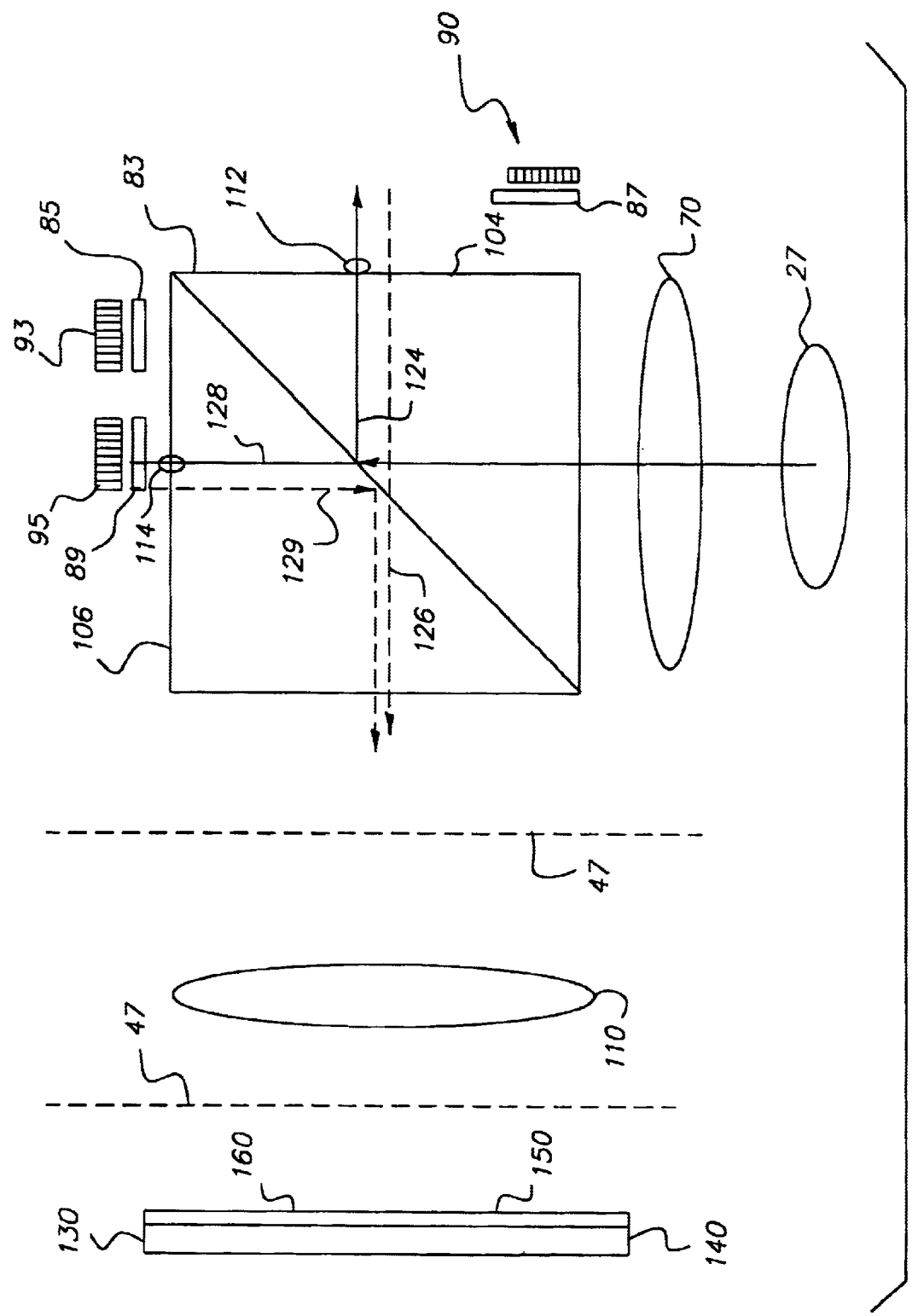
FIG. 8 is a schematic view of reflective LCD modulator printing system utilizing a polarizing beamsplitter and three reflective LCD modulators printing side by side.

It should be noted that in all embodiments featuring a polarizing beamsplitter 80 and the use of multiple reflective LCD modulators, discussion has centered on the use of two reflective LCD modulators. This approach however, can be generalized to many reflective LCD modulators, as there is sufficient area on each facet of polarizing beamsplitter 80 to accommodate multiple LCDs. Such a system is shown in FIG. 8, where two reflective LCD modulators 93, 95 are placed along one facet and a third 90 along another facet. All three LCDs are displaced from each other along the imaging axis. The result is three distinct images. By feeding distinct image data color sequentially, three distinct images are created. Using a large number of LCDs requires both a large beamsplitting cube 83 as well as reasonably small LCDs. In this embodiment, color filters 85, 87, and 89 are located between the beamsplitter 83 and LCDs 90, 93, and 95.

Figure 9A:
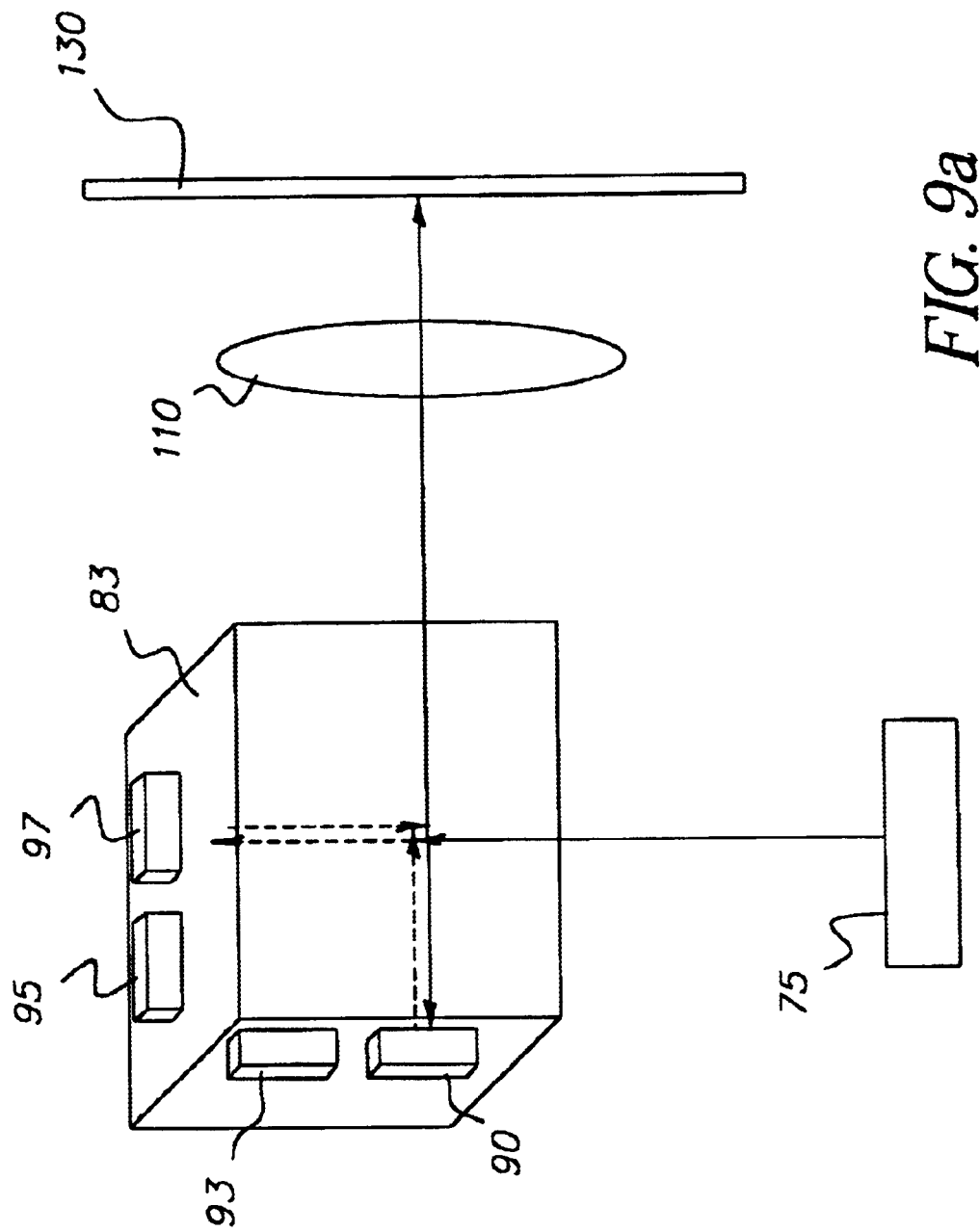
FIG. 9a is a two dimensional view of a reflective LCD based printing system utilizing a beamsplitting cube and four reflective LCD modulators.
Figure 9B:
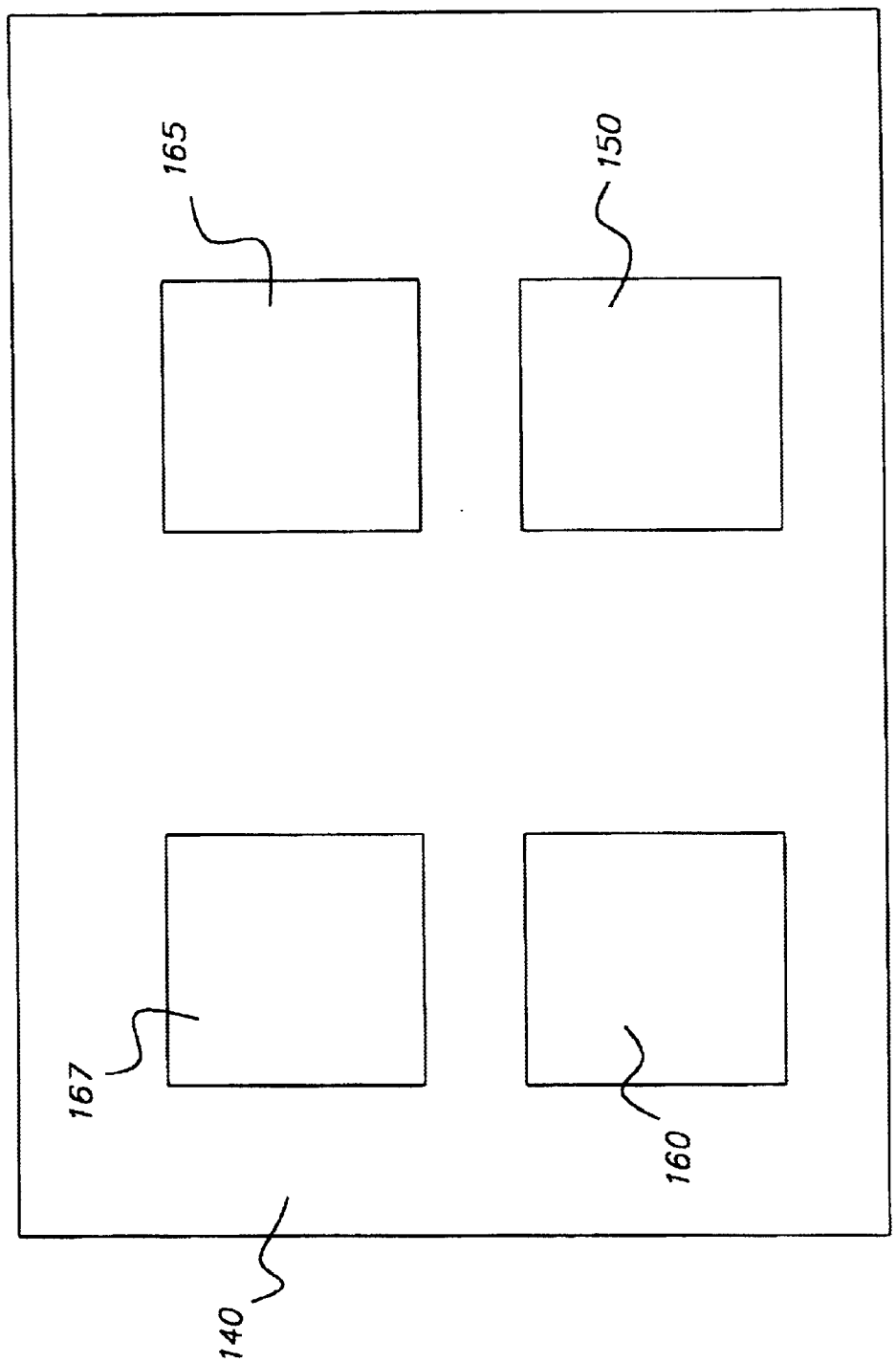
FIG. 9b is a view of the media with four simultaneously imaged LCDs.

An additional example of a multi-chip, multi-up printing system uses 4 LCDs 90, 93, 95, 97 aligned along two facets of the large beamsplitter cube 83 along two dimensions. FIG. 9*a* shows a system with four LCDs aligned along two dimensions of the large beamsplitter cube 83 and imaged at the image plane 130. At the light sensitive media 140 shown in FIG. 9*b*, 4 distinct images are printed 150, 160, 165, 167, thus doubling the productivity of the multi-up system. Additionally, multiple polarizing beamsplitters and x-prisms may be employed to incorporate multiple devices.

One of the key aspects governing this printing system, which is applicable to all embodiments, is the means used to achieve sufficient uniformity while retaining the gray scale. The reflective LCD modulator 90 alone can receive up to 8 bits of bit depth. However, 8 bits to the modulator may not translate to 8 bits at the media. To print an adequate gray scale, additional bit depth must be provided. Furthermore, reflective LCD modulators are known to have some measure of roll-off or loss of contrast at the edges of the device. To address both these issues, the print system takes advantage of the fact that modulators designed for projection display generally refresh data faster then required for printing. Consequently, it is possible to create a single color image at the media as a superposition of a series of images of a given color. The individual images that comprise the final image vary both in information content and illumination.

First, every image to each modulator is broken into the three basic color components. Information corresponding to the red content of the image is displayed on the modulator. Within each color, multiple frames of image data are displayed on the modulator. Once an acceptable frame is displayed on the modulator, the first illumination pulse is employed. Following the recording of the initial frame of data, a subsequent frame is displayed on the modulator. The illumination level of the subsequent frame is altered according to the density requirements at the media. Similarly, as many frames as may be needed are introduced at the modulator and imaged at the media with the illumination adjusted accordingly. It is possible to maintain the same image data at the modulator and by altering the illumination level alone, introduce additional bit depth. By varying the illumination level, or duration, or both, and by altering the information content, the system can build a composite image out of a series of preliminary images. The superposition of the images in a given color of varied information content and varied illumination level introduces additional bit depth to the composite image. Once a given color is printed the same procedure is repeated with the data and illumination corresponding to the next color.

Creating a balanced composite image comprised of several images provides many challenges both in gray scale generation as well in elimination of artifacts. When multiple LCDs are employed each LCD transmission and gray scale profile must be mapped. The image data transmitted to each LCD must reflect the characteristics of that device, for the illumination of the system. For example, the reflective LCD modulator 90 in FIG. 3 may have higher transmission characteristics than the reflective LCD modulator 95. The corresponding image data must reflect the discrepancy and balance it out. There are several ways to balance such a discrepancy. First, each device can be loaded with its own electro-optic response curve. The top surface of LCD 52 and backplane of LCD 56 voltages can be set independently. The code values can be mapped differently to the two devices. For example, code value of 200 for reflective LCD modulator 90 may actually be a shorter pulse duration in a pulse width scheme or a lower drive voltage in analog scheme than code of 200 for reflective LCD modulator 95, if reflective LCD modulator 95 does not have an equal transmission characteristic, or the net light level reaching or departing reflective LCD modulator 95 is lower than reflective LCD modulator 90, such correction would be required. Each device will require it's own gray scale calibration. It is possible for devices that are mapping 14–16 bit tables to an 8-bit device, and then the same driver board may be employed, with different mappings of the two devices. In the case of interwoven images, this balancing is the primary adjustment.

The second concern in the imaging system is to correct non-uniformities in the print. The exposure system can correct for some non-uniformities such as roll-off at the modulator edges. One way to accomplish this is to introduce additional image data to the modulator activating only the edge modulator sites. These images are exposed and superimposed on the other images thus giving additional depth to the edge regions. An example method would be to scan a series of images taken at the reflective LCD modulators 90, 95, create data maps, and convolve all input data with initial maps of the reflective LCD modulators 90, 95 to correct the image. Similar techniques can be used to adjust for modulator non-uniformities that are known prior to operation.

Another concern is image quality and the presence of artifacts. Each device will need it's own gray scale and individual uniformity map. For embodiments utilizing multiple LCDs the gray scale needs can be established either as the same function for both devices or independently for each device. (One LCD may print 8 bits while the other prints 2-bit text). This may require a different e-o curve for that region or simply a different mapping of code values, or grayscale values for each. Such an algorithm may require use of multiple exposures to isolate overlap data from non-overlap data. If this is not possible the image data should be adjusted or offset such that the composite image produces the same gray scale as non-overlapped regions.

If dithering is employed gray scale generation, uniformity correction, and artifact reduction should be mapped as a function of the dither. Because of the digital addressability of the reflective LCD modulator and the pulsed LED illumination method of illumination, this approach to printing provides an adequate bit depth and reasonable timing for use in a photographic printer.

Until this point, all the embodiments refer to polychromatic printing obtained through color sequential printing. It should be understood that monochromatic printing can be obtained through the identical means and apparatus. Instead of three colors of illumination there is only one.

Monochromatic printing however provides a few methods of printing that are not readily available to polychromatic systems. First, with regard to the illuminator, the light source can consists of one color LEDs, or one-color lasers. Color filters can be completely avoided.

Figure 10:
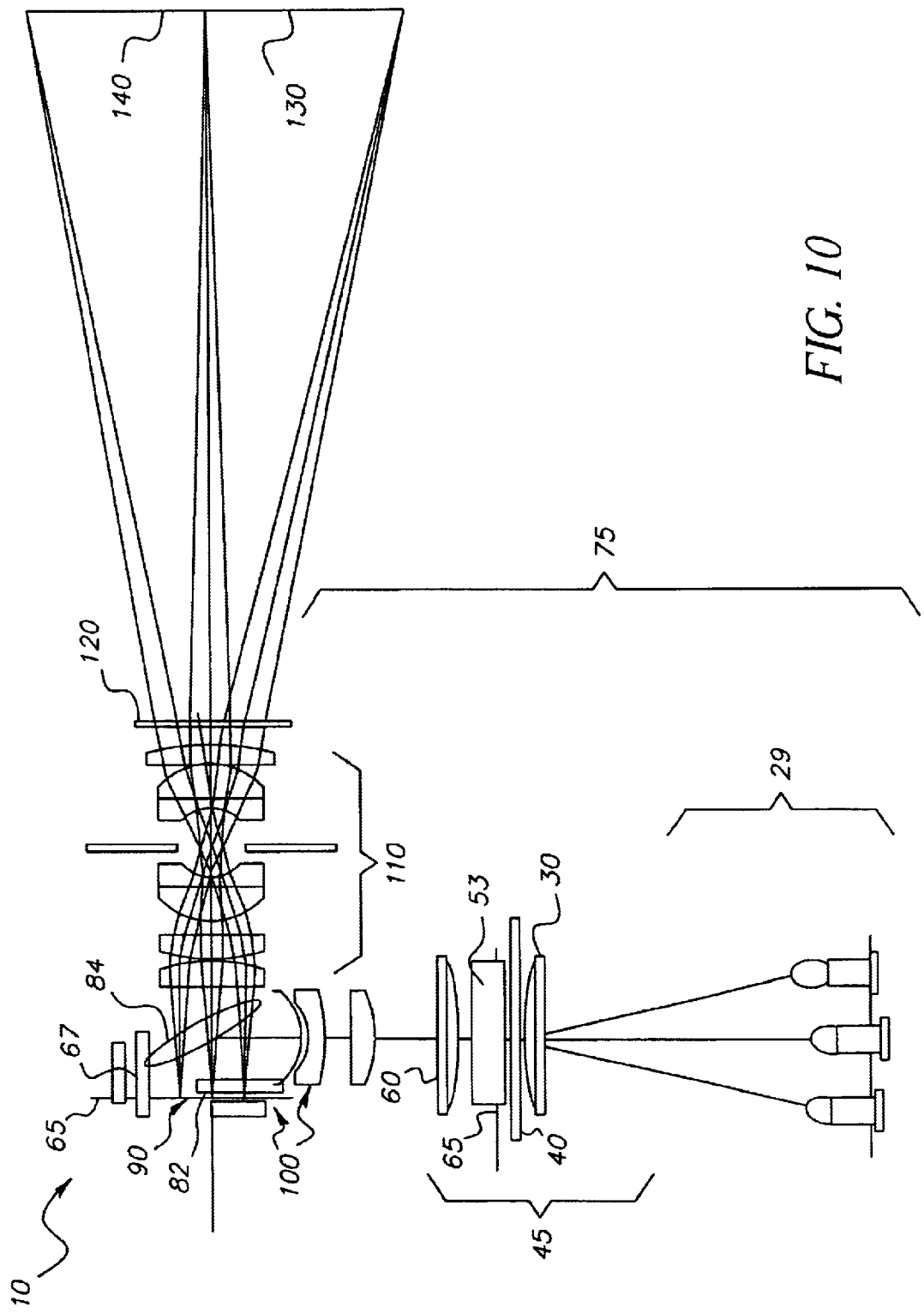
FIG. 10 is a schematic view of a reflective LCD modulator printing system utilizing laser light sources, an integrating bar, and pellicle beamsplitter.

Secondly, the polarizing beamsplitter can be replaced with a pellicle beamsplitter 84, shown in FIG. 10. Pellicles are not polarization splitters, rather they split light along two directions independent of polarization state. The performance of the pellicle is strongly a function of wavelength. When dealing with a particular wavelength of operation the pellicle can create an interference or a scattering effect, which may appear as a very slight displacement of the optical field. When dealing with a monochromatic system, the effects are not noticeable because the displacement is slight. When the system is polychromatic, the relative displacements of the beams are a function of color. Each color displaces slightly differently. The effect is uniform illumination at the center of the modulator and color fringes at the peripheries. The resulting printed image would exhibit strong color fringes at the edges. Such performance would be unacceptable in a polychromatic system. So, the pellicles are more suited for monochromatic operation.

When employing a pellicle 84 there are several ways to deal with the polarization issues of the device. Polarizers 40, 120 may be placed both before and after the pellicle. If efficiency is not an issue, a single clean up linear polarizer 120 can be used after the pellicle to eliminate the unmodulated light. The pellicle method will be cheaper but less efficient than a polarizing beamsplitter. If the system uses a polarizing cube, the coating need no longer be a broadband coating.

For the case of a laser illuminator, laser array 29, an integrating bar 53 may be a better choice for dealing with interference. This is not a major issue with monochromatic printing, but should be examined for polychromatic printing. The entire optical system is strongly telecentric for a polychromatic system. For a monochromatic system, the requirement for telecentricity can be relaxed. The exit linear polarizer 120 can be used to clean up the residual light leakage at a single wavelength.

Finally, in one embodiment a waveplate 82 or polarization compensator is placed between the LCD and the cube to increase efficiency. The waveplate corrects any inefficiency in polarization rotation with respect to the axis of the polarizers or a polarizing cube. Because waveplates are wavelength specific, it would be difficult to include them in a color sequential system but works well for a monochromatic system. FIG. 10 is a diagram of a multichip monochromatic imaging system utilizing many of the unique features of monochromatic printing. In this embodiment, laser array 29 which emits light of the same wavelength. Other monochromatic light sources are also suitable for this invention. The media can be paper, film, or any light sensitive media.

The invention has been described in detail with particular reference to certain preferred embodiments thereof, but it will be understood that variations and modifications can be effected within the scope of the invention. For example, this method of printing can be utilized for light sensitive media. Also, print lens can be used for magnification or demagnification or a one to one imaging lens.

PARTS LIST

10. Photographic printing system
12. Light emitting diodes (LEDs)
19. Data path
25. LED array
27. Halogen lamp
29. Laser array
30. Field lens
40. Polarizer
45. Uniformizing optics
50. Lenslet array
52. Top surface of LCD
53. Integrating bar
54. Liquid crystal material
56. Backplane of LCD
60. Field lens
65. Conjugate planes
67. Modulator plane
70. Condenser lens
75. Illumination optics
80. Polarizing beamsplitter
82. Waveplate
83. Large beamsplitter cube
84. Pellicle
85. Color filter
87. Color filter
89. Color filter
90. Reflective LCD modulator
92. Modulator site
93. Reflective LCD modulator
95. Reflective LCD modulator
97. Reflective LCD modulator
100. Center of reflective LCD modulator 90
102. Center of reflective LCD modulator 95
104. Facet
106. Facet
110. Print lens assembly
112. Center of beamsplitter element facet 104
114. Center of beamsplitter element facet 106
120. Linear polarizer
122. Incident light
124. S-polarization state
126. Reflected p-polarization
128. P-polarization state
129. Reflected s-polarization light
130. Image plane
140. Light sensitive media
150. Image of reflective LCD modulator 90
160. Image of reflective LCD modulator 95
165. Image of LCD modulator 93
167. Image of LCD modulator 97
230. Initial LCD position
240. Modulator sites
250. Second modulator position
260. Third modulator position
270. Fourth modulator position dithering

What is claimed is:

1. A method of printing multiple simultaneous images onto a photosensitive media comprising the steps of:

imaging light from a light source through an optics assembly;

passing said light from said optics assembly through a polarization beamsplitter element to produce a first polarization state of said light and a second polarization state of said light;

directing said first polarized light to a first spatial light modulator to create an essentially telecentric illumination at said first spatial light modulator;

addressing said first spatial light modulator with a first signal to create a first modulated light beam;

imaging said first modulated light beam through a print lens assembly onto said photosensitive media to create a first image on said photosensitive media;

directing said second polarized light to a second spatial light modulator to create an essentially telecentric illumination at said second spatial light modulator;

addressing said second spatial light modulator with a second signal to create a second modulated light beam; and imaging said second modulated light beam through said print lens assembly onto said photosensitive media to create a second image spatially separated from said first image, on said photosensitive media.

2. A method according to claim 1, comprising the additional steps of:

passing said first modulated light beam through said polarization beamsplitter prior to passing through said print lens; and passing said second modulated light beam through said polarization beamsplitter prior to passing through said print lens.

3. A method according to claim 1 wherein said light source is a monochromatic light source.

4. A method according to claim 1 wherein said light source is a halogen light source.

5. A method according to claim 1 wherein said light source is an LED array.

6. A method according to claim 5 wherein said LED array is comprised of multiple emitters wherein at least one of said emitters emits a first wavelength of light and wherein at least one of said emitters emits a second wavelength of light.

7. A method according to claim 1 wherein said first spatial light modulator is located on a portion of a first facet of said polarization beamsplitter and said second spatial light modulator is located on a portion of a second facet of said polarization beamsplitter.

8. A method according to claim 1 comprising the further step of varying a backplane voltage of each spatial light modulator.

9. A method according to claim 1 wherein:

each of said images is polychromatic; and each modulator is addressed color sequentially.

10. A method of printing according to claim 1 wherein said first spatial light modulator has a first transmission characteristic and said second spatial light modulator has a second transmission characteristic.

11. A method according to claim 1 wherein a first set of code values are mapped to said first spatial light modulator and a second set of code values are mapped to said second spatial light modulator to provide uniformity.

12. A method of printing multiple images onto a photosensitive media comprising the steps of:

imaging light from a light source through an optics assembly;

polaizaioneleentpassing said light from said optics assembly through a polaizaioneleentto produce a first polarization state of said light;

directing said polarized light to a pellicle;

passing said polarized light from said pellicle to a first spatial light modulator to create an essentially telecentric illumination at said first spatial light modulator;

addressing said first spatial light modulator with a first signal to create a first modulated light beam;

imaging said first modulated light beam through a print lens assembly onto said photosensitive media to create a first image on said photosensitive media;

passing said polarized light from said pellicle to a second spatial light modulator to create an essentially telecentric illumination at said second spatial light modulator;

addressing said second spatial light modulator with a second signal to create a second modulated light beam; and imaging said second modulated light beam through said print lens assembly onto said photosensitive media to create a second image, spatially separated from said first image, and having a different aspect ratio than said first image on said photosensitive media.

\* \* \* \* \*